US010430192B2

United States Patent
Stephens et al.

(10) Patent No.: US 10,430,192 B2
(45) Date of Patent: Oct. 1, 2019

(54) VECTOR PROCESSING USING LOOPS OF DYNAMIC VECTOR LENGTH

(71) Applicant: ARM LIMITED, Cambridge (GB)

(72) Inventors: Nigel John Stephens, Cambridge (GB); Grigorios Magklis, Cambridge (GB); Alejandro Martinez Vicente, Cambridge (GB); Nathanael Premillieu, Antibes (FR); Mbou Eyole, Soham (GB)

(73) Assignee: ARM Limited, Cambridge (GB)

( * ) Notice: Subject to any disclaimer, the term of this patent is extended or adjusted under 35 U.S.C. 154(b) by 34 days.

(21) Appl. No.: 15/748,734

(22) PCT Filed: Jul. 28, 2016

(86) PCT No.: PCT/EP2016/068013
§ 371 (c)(1),
(2) Date: Jan. 30, 2018

(87) PCT Pub. No.: WO2017/021269
PCT Pub. Date: Feb. 9, 2017

(65) Prior Publication Data
US 2019/0012176 A1 Jan. 10, 2019

(30) Foreign Application Priority Data
Jul. 31, 2015 (EP) .................................... 15386025

(51) Int. Cl.
*G06F 9/30* (2018.01)
*G06F 9/38* (2018.01)

(52) U.S. Cl.
CPC ...... *G06F 9/30149* (2013.01); *G06F 9/30036* (2013.01); *G06F 9/30065* (2013.01);
(Continued)

(58) Field of Classification Search
None
See application file for complete search history.

(56) References Cited

U.S. PATENT DOCUMENTS

| 4,745,547 A * | 5/1988 | Buchholz | G06F 9/30032 712/4 |
| 5,537,606 A * | 7/1996 | Byrne | G06F 9/30109 711/169 |

(Continued)

FOREIGN PATENT DOCUMENTS

| EP | 2 725 484 | 4/2014 | |
| EP | 2725484 A1 * | 4/2014 | ......... G06F 9/30072 |

(Continued)

OTHER PUBLICATIONS

European Office Action dated Jul. 5, 2018 in EP Application 15386025.9, 10 pages.

(Continued)

*Primary Examiner* — William B Partridge
(74) *Attorney, Agent, or Firm* — Nixon & Vanderhye P.C.

(57) ABSTRACT

Data processing apparatus comprises processing circuitry to selectively apply vector processing operations to one or more data items of a data vector comprising a plurality of data items at respective positions in the data vector, according to the state of respective predicate flags associated with the positions; the processing circuitry comprising: instruction decoder circuitry to decode program instructions; and instruction processing circuitry to execute instructions decoded by the instruction decoder circuitry; wherein the instruction decoder circuitry is responsive to a WHILE instruction and a CHANGE instruction, to control the instruction processing dependent upon a number of the predicate flags.

12 Claims, 6 Drawing Sheets

(52) U.S. Cl.
CPC ...... *G06F 9/30072* (2013.01); *G06F 9/30076* (2013.01); *G06F 9/3836* (2013.01)

(56) References Cited

U.S. PATENT DOCUMENTS

| | | | | |
|---|---|---|---|---|
| 2013/0151822 A1* | 6/2013 | Eichenberger | ...... | G06F 9/30018 712/234 |
| 2014/0095830 A1* | 4/2014 | Plotnikov | ........... | G06F 9/30018 712/204 |
| 2014/0189287 A1* | 7/2014 | Plotnikov | ........... | G06F 9/30145 712/3 |

FOREIGN PATENT DOCUMENTS

| | | | | |
|---|---|---|---|---|
| WO | WO 2002/084451 | 10/2002 | | |
| WO | WO-02084451 A2 * | 10/2002 | ......... | G06F 9/30036 |
| WO | WO 2013/089707 | 6/2013 | | |
| WO | WO-2013089707 A1 * | 6/2013 | ......... | G06F 9/30036 |

OTHER PUBLICATIONS

International Search Report and Written Opinion of the ISA for PCT/EP2016/068013, dated Oct. 21, 2016, 15 pages.
Extended Search Report for EP 15386025.9, dated Apr. 18, 2016, 9 pages.
Summons to attend oral proceedings for EP Application No. 15386025.9 dated May 31, 2019, 12 pages.

* cited by examiner

VECTOR PROCESSING USING LOOPS OF DYNAMIC VECTOR LENGTH

This application is the U.S. national phase of International Application No. PCT/EP2016/068013 filed Jul. 28, 2016, which designated the U.S. and claims priority to EP Patent Application No. 15386025.9 filed Jul. 31, 2015, the entire contents of each of which are hereby incorporated by reference.

BACKGROUND

This disclosure relates to data processing apparatus and methods.

Some data processing arrangements allow for vector processing operations, involving applying a single vector processing instruction to data items of a data vector having a plurality of data items at respective positions in the data vector. By contrast, scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

SUMMARY

In an example arrangement there is provided a data processing apparatus comprising:
 processing circuitry to selectively apply vector processing operations to one or more data items of a data vector comprising a plurality of data items at respective positions in the data vector, according to the state of respective predicate flags associated with the positions; the processing circuitry comprising:
  instruction decoder circuitry to decode program instructions; and
  instruction processing circuitry to execute instructions decoded by the instruction decoder circuitry;
  wherein the instruction decoder circuitry is responsive to a CHANGE instruction having a modifying value as an instruction parameter, to control the instruction processing circuitry to change the value of a variable by an amount dependent upon a number of the predicate flags and the modifying value.

In another example arrangement there is provided data processing apparatus comprising:
 means for selectively applying vector processing operations to one or more data items of a data vector comprising a plurality of data items at respective positions in the data vector, according to the state of respective predicate flags associated with the positions; the applying means comprising:
  means for decoding instructions; and
  means for executing instructions decoded by the means for decoding;
  wherein the means for decoding instructions is responsive to a CHANGE instruction having a modifying value as an instruction parameter to control the means for executing instructions to change the value of a variable by an amount dependent upon a number of the predicate flags and dependent upon the modifying value.

In another example arrangement there is provided a data processing method comprising:
 selectively applying vector processing operations to one or more data items of a data vector comprising a plurality of data items at respective positions in the data vector, according to the state of respective predicate flags associated with the positions;
 decoding instructions; and
 executing instructions;
 in which the decoding step is responsive to a CHANGE instruction having a modifying value as an instruction parameter to control the executing step to change the value of a variable by an amount dependent upon a number of the predicate flags and dependent upon the modifying value.

In another example arrangement there is provided a virtual machine comprising a data processor to execute a computer program comprising machine readable instructions, in which execution of the computer program causes the data processor to operate as a data processing apparatus comprising:
 a processor to selectively apply vector processing operations to one or more data items of a data vector comprising a plurality of data items at respective positions in the data vector, according to the state of respective predicate flags associated with the positions; the processor comprising:
  an instruction decoder to decode instructions; and
  an instruction processor to execute instructions decoded by the instruction decoder.
  in which the instruction decoder is responsive to a CHANGE instruction having a modifying value as an instruction parameter to control the instruction processor to change the value of a variable by an amount dependent upon a number of the predicate flags and dependent upon the modifying value.

In another example arrangement there is provided a data processing apparatus comprising:
 instruction decoder circuitry to decode instructions; and
 instruction processing circuitry to execute instructions decoded by the instruction decoder circuitry;
  the instruction decoder circuitry being responsive to a WHILE instruction to control the instruction processing circuitry to apply a vector processing instruction to one or more data items of a data vector defined at least in part by a control variable, the data vector comprising a plurality of data items at respective positions in the data vector, according to the state of respective predicate flags associated with the positions, while an arithmetic condition applies to the control variable; and
  the instruction decoder circuitry being responsive to a CHANGE instruction to control the instruction processing circuitry to change the value of the control variable by an amount dependent upon a number of the predicate flags according to an associated saturation value so as to change the value of the control variable no further than the saturation value.

In another example arrangement there is provided a data processing apparatus comprising:
 means for decoding instructions; and
 means for executing instructions decoded by the means for decoding;
  the means for decoding being responsive to a WHILE instruction to control the means for executing to apply a vector processing instruction to one or more data items of a data vector defined at least in part by a control variable, the data vector comprising a plurality of data items at respective positions in the data vector, according to the state of respective predicate flags associated with the positions, while an arithmetic condition applies to the control variable; and the means for decoding being responsive to a CHANGE instruction to control the means for executing to change the value of the control variable by an amount dependent upon a number of the predicate flags which are currently set to a particular state, the CHANGE instruction having an associated saturation value, so that execution of the CHANGE instruction being operable to change the value of the control variable no further than the saturation value.

In another example arrangement there is provided a data processing method comprising:

decoding instructions; and executing instructions decoded by the decoding step;

the decoding step being responsive to a WHILE instruction to control the executing step to apply a vector processing instruction to one or more data items of a data vector defined at least in part by a control variable, the data vector comprising a plurality of data items at respective positions in the data vector, according to the state of respective predicate flags associated with the positions, while an arithmetic condition applies to the control variable; and the decoding step being responsive to a CHANGE instruction to control the executing step to change the value of the control variable by an amount dependent upon a number of the predicate flags which are currently set to a particular state, the CHANGE instruction having an associated saturation value, so that execution of the CHANGE instruction changing the value of the control variable no further than the saturation value.

In another example arrangement there is provided a virtual machine comprising a data processor to execute a computer program comprising machine readable instructions, in which execution of the computer program causes the data processor to operate as a data processing apparatus comprising:

an instruction decoder to decode instructions; and an instruction processor to execute instructions decoded by the instruction decoder;

the instruction decoder being responsive to a WHILE instruction to control the instruction processor to apply a vector processing operation to one or more data items of a data vector defined at least in part by a control variable, the data vector comprising a plurality of data items, according to the state of respective predicate flags associated with the plurality of data items, while an arithmetic condition applies to the control variable; and the instruction decoder being responsive to a CHANGE instruction to control the instruction processor to change the value of the control variable by an amount dependent upon a number of the predicate flags which are currently set to a particular state, the CHANGE instruction having an associated saturation value, so that execution of the CHANGE instruction, when executed, changing the value of the control variable no further than the saturation value.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
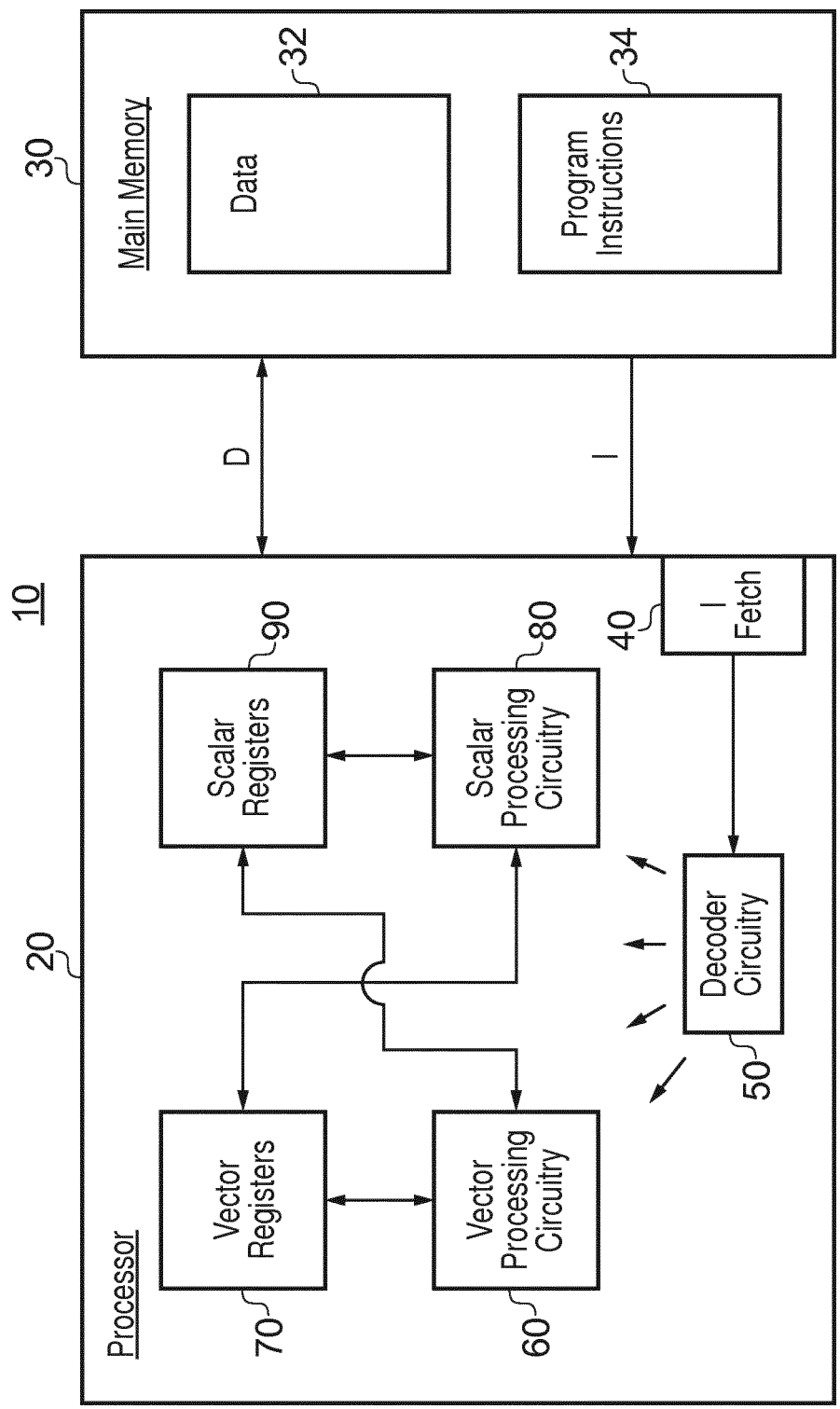
FIG. 1 schematically illustrates a data processing apparatus.

Before discussing the embodiments with reference to the accompanying figures, the following description of embodiments is provided.

An example embodiment provides data processing apparatus comprising:

processing circuitry to selectively apply vector processing operations to one or more data items of a data vector comprising a plurality of data items at respective positions in the data vector, according to the state of respective predicate flags associated with the positions; the processing circuitry comprising:

instruction decoder circuitry to decode program instructions; and instruction processing circuitry to execute instructions decoded by the instruction decoder circuitry;

wherein the instruction decoder circuitry is responsive to a CHANGE instruction having a modifying value as an instruction parameter, to control the instruction processing circuitry to change the value of a variable by an amount dependent upon a number of the predicate flags and the modifying value.

The present disclosure recognises that in the case of program instructions intended for execution by different instances of vector processing circuitry (without a recompilation process) where those different instances may have different available vector lengths $V_L$, it can be useful to provide arrangements for controlling looped or other operations which operate according to whatever is the available length $V_L$ of the vector processing circuitry by which the instructions are being executed. (An alternative, which would be to fix a notional $V_L$ at the smallest level which may be encountered amongst the different instances of vector processing circuitries, could be inefficient by not making use of larger vector lengths available with some instances.)

Embodiments of the present disclosure provide a CHANGE instruction which, when executed, modifies a variable (such as a loop control variable) by an amount dependent upon a number of predicate flags (for example, as a proxy for the vector length), and can therefore set the amount of the change according to the vector length of the system by which the instruction is being executed. This can allow the same program instructions to be executed, without necessarily requiring recompilation, on different instances of the vector processing circuitry having different respective available vector lengths.

The use of the modifying value allows a single CHANGE instruction to be used in (for example) loop control or other vector operation where the vector operation is "unrolled", which is to say that multiple data vectors are processed at a single iteration or instance of a loop or other set of processing instructions.

In example embodiments, the instruction decoder circuitry is responsive to the CHANGE instruction to control the instruction processing circuitry to change the value of the variable by an amount dependent upon a product of a value dependent upon the number of the predicate flags and the modifying value. In examples, the modifying value can be a multiplicative value. In examples, the step between successive values of the control variable set by the CHANGE instruction can be dependent upon, such as proportional to, the modifying value.

To allow the value of the variable to be tested by a simple arithmetic test, to determine (for example) whether a loop has completed, in example embodiments the CHANGE instruction has an associated saturation value, so that the CHANGE instruction, when executed, changes the value of the variable no further than the saturation value.

In some examples, the CHANGE instruction is a decrementing instruction to reduce the value of the variable; and the saturation value is a minimum value which can be represented by the variable. In other examples, the CHANGE instruction is an incrementing instruction to increase the value of the variable; and the saturation value is a maximum value which can be represented by the variable.

The CHANGE instruction is particularly (though not exclusively) useful in the context of loop control, and in example embodiments the variable is a counter variable, the vector processing circuitry applying the vector processing instruction to a data vector defined at least in part by the counter variable during one or more iterations of a processing loop; the instruction decoder circuitry being responsive to a further instruction to control the instruction processing circuitry to detect whether to continue iteratively executing the processing loop in dependence upon the counter variable.

In example embodiments, the further instruction to detect whether to continue executing the processing loop comprises a WHILE instruction, the instruction decoder circuitry being responsive to the WHILE instruction to control the instruction processing circuitry to continue iteratively executing the processing loop while an arithmetic condition applies to the counter variable. For example, the arithmetic condition may be a condition selected from the list consisting of:

i. the counter variable being less than an upper limit value;
ii. the counter variable being greater than a lower limit value;
iii. the counter variable being less than or equal to an upper limit value; and
iv. the counter variable being greater than or equal to a lower limit value.

Because the number of predicate flags may not in some instances equal the vector length of a system, in some examples the instruction decoder circuitry is responsive to the CHANGE instruction to control the instruction processing circuitry to change the value of the variable by an amount dependent upon a selected subset of the number of the predicate flags (for example, as selected by the processing circuitry), and the modifying value.

As discussed below, in example embodiments the instruction decoder circuitry is responsive to the WHILE instruction to control the instruction processing circuitry to select one or more of the predicate flags for setting to the active state so that a value of the loop variable, taking into account the number of predicate flags selected for setting to the active state, does not breach the arithmetic condition. As discussed below, in example embodiments the instruction decoder circuitry is responsive to the WHILE instruction to control the instruction processing circuitry to select one or more of the predicate flags for setting to the active state according to a predetermined ordering of the predicate flags, so that a value of the loop variable, taking into account the number of predicate flags selected for setting to the active state, does not breach the arithmetic condition.

An example embodiment also provides data processing apparatus comprising:

means for selectively applying vector processing operations to one or more data items of a data vector comprising a plurality of data items at respective positions in the data vector, according to the state of respective predicate flags associated with the positions; the applying means comprising:

means for decoding instructions; and
means for executing instructions decoded by the means for decoding;

wherein the means for decoding instructions is responsive to a CHANGE instruction having a modifying value as an instruction parameter to control the means for executing instructions to change the value of a variable by an amount dependent upon a number of the predicate flags and dependent upon the modifying value.

An example embodiment also provides a data processing method comprising:

selectively applying vector processing operations to one or more data items of a data vector comprising a plurality of data items at respective positions in the data vector, according to the state of respective predicate flags associated with the positions;

decoding instructions; and
executing instructions;

in which the decoding step is responsive to a CHANGE instruction having a modifying value as an instruction parameter to control the executing step to change the value of a variable by an amount dependent upon a number of the predicate flags and dependent upon the modifying value.

An example embodiment also provides a virtual machine comprising a data processor to execute a computer program comprising machine readable instructions, in which execution of the computer program causes the data processor to operate as a data processing apparatus comprising:

a processor to selectively apply vector processing operations to one or more data items of a data vector comprising a plurality of data items at respective positions in the data vector, according to the state of respective predicate flags associated with the positions; the processor comprising:

an instruction decoder to decode instructions; and
an instruction processor to execute instructions decoded by the instruction decoder.

in which the instruction decoder is responsive to a CHANGE instruction having a modifying value as an instruction parameter to control the instruction processor to change the value of a variable by an amount dependent upon a number of the predicate flags and dependent upon the modifying value.

In the context of data processing operations such as (for example) the control of looped operation in a vector processing system, example embodiments can make use of a saturating counter and an elegantly simple arithmetic test to control execution of looped functions. An example embodiment provides data processing apparatus comprising:

instruction decoder circuitry to decode instructions; and
instruction processing circuitry to execute instructions
decoded by the instruction decoder circuitry;
the instruction decoder circuitry being responsive to a
WHILE instruction to control the instruction processing circuitry to apply a vector processing instruction to
one or more data items of a data vector defined at least
in part by a control variable, the data vector comprising
a plurality of data items at respective positions in the
data vector, according to the state of respective predicate flags associated with the positions, while an arithmetic condition applies to the control variable; and
the instruction decoder circuitry being responsive to a
CHANGE instruction to control the instruction processing
circuitry to change the value of the control variable by an
amount dependent upon a number of the predicate flags
according to an associated saturation value so as to change
the value of the control variable no further than the saturation value.

By inhibiting the counter from going beyond a saturation value, invalid results (such as results which would be caused by a counter wrapping round or overflowing the number of bits in the counter variable, for example) can be avoided.

In example embodiments the arithmetic condition is a condition selected from the list consisting of:
  i. the control variable being less than an upper limit value;
  ii. the control variable being greater than a lower limit value;
  iii. the control variable being less than or equal to an upper limit value; and
  iv. the control variable being greater than or equal to a lower limit value.

In example embodiments the predicate flags can be used as part of the control functionality. In example embodiments the predicate flags have an active state indicating that the vector processing instruction should be applied to those positions of a data vector corresponding to predicate flags in the active state.

In example embodiments the instruction decoder circuitry is responsive to the WHILE instruction to control the instruction processing circuitry to select one or more of the predicate flags for setting to the active state so that a value of the control variable, taking into account (for example, adding or subtracting as the case may be) the number of predicate flags selected for setting to the active state, does not breach the arithmetic condition. In this way the WHILE instruction can conveniently use the mechanism of predicate flags for execution control such as loop control.

In example embodiments the instruction decoder circuitry is responsive to the WHILE instruction to control the instruction processing circuitry to select one or more of the predicate flags for setting to the active state according to a predetermined ordering of the predicate flags. For example, the ordering may be an ordering corresponding to that of the underlying data items to be processed.

In example embodiments the instruction decoder circuitry is responsive to the WHILE instruction to control the instruction processing circuitry to continue iteratively executing a processing loop while an arithmetic condition applies to the control variable.

An example embodiment also provides data processing apparatus comprising:
  means for decoding instructions; and
  means for executing instructions decoded by the means for decoding;
  the means for decoding being responsive to a WHILE instruction to control the means for executing to apply a vector processing instruction to one or more data items of a data vector defined at least in part by a control variable, the data vector comprising a plurality of data items at respective positions in the data vector, according to the state of respective predicate flags associated with the positions, while an arithmetic condition applies to the control variable; and
  the means for decoding being responsive to a CHANGE instruction to control the means for executing to change the value of the control variable by an amount dependent upon a number of the predicate flags which are currently set to a particular state, the CHANGE instruction having an associated saturation value, so that execution of the CHANGE instruction being operable to change the value of the control variable no further than the saturation value.

An example embodiment also provides a data processing method comprising:
  decoding instructions; and
  executing instructions decoded by the decoding step;
  the decoding step being responsive to a WHILE instruction to control the executing step to apply a vector processing instruction to one or more data items of a data vector defined at least in part by a control variable, the data vector comprising a plurality of data items at respective positions in the data vector, according to the state of respective predicate flags associated with the positions, while an arithmetic condition applies to the control variable; and
  the decoding step being responsive to a CHANGE instruction to control the executing step to change the value of the control variable by an amount dependent upon a number of the predicate flags which are currently set to a particular state, the CHANGE instruction having an associated saturation value, so that execution of the CHANGE instruction changing the value of the control variable no further than the saturation value.

An example embodiment also provides a virtual machine comprising a data processor to execute a computer program comprising machine readable instructions, in which execution of the computer program causes the data processor to operate as a data processing apparatus comprising:
  an instruction decoder to decode instructions; and
  an instruction processor to execute instructions decoded by the instruction decoder;
  the instruction decoder being responsive to a WHILE instruction to control the instruction processor to apply a vector processing operation to one or more data items of a data vector defined at least in part by a control variable, the data vector comprising a plurality of data items, according to the state of respective predicate flags associated with the plurality of data items, while an arithmetic condition applies to the control variable; and
  the instruction decoder being responsive to a CHANGE instruction to control the instruction processor to change the value of the control variable by an amount dependent upon a number of the predicate flags which are currently set to a particular state, the CHANGE instruction having an associated saturation value, so that execution of the CHANGE instruction, when executed, changing the value of the control variable no further than the saturation value.

Referring now to the drawings, FIG. 1 schematically illustrates a data processing system 10 comprising a processor 20 coupled to a memory 30 storing data values 32 and program instructions 34. The processor 20 includes an instruction fetch unit 40 for fetching program instructions 34 from the memory 30 and supplying the fetch program instructions to decoder circuitry 50. The decoder circuitry 50 decodes the fetched program instructions and generates control signals to control vector processing circuitry 60 to perform vector processing operations upon vector registers stored within vector register circuitry 70 as specified by the decoded vector instructions.

The processor 20 also comprises scalar processing circuitry 80 associated with scalar registers 90.

A general distinction between scalar processing and vector processing is as follows. Vector processing involves applying a single vector processing instruction to data items of a data vector having a plurality of data items at respective positions in the data vector. Scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

The discussion below relates to example program instructions 34. Embodiments of the present disclosure include an apparatus, for example of the type shown in FIG. 1, operable or configured to decode and execute such program instructions. FIG. 1 therefore provides an example of processing circuitry to selectively apply a vector processing operation to data items at positions within data vectors according to the states of a set or respective predicate flags (discussed below) associated with the positions, the data vectors having a data vector processing order, each data vector comprising a plurality of data items having a data item order, the processing circuitry comprising instruction decoder circuitry to decode program instructions; and instruction processing circuitry to execute instructions decoded by the instruction decoder circuitry; wherein the instruction decoder circuitry is responsive to instructions to control the instruction processing circuitry to carry out functionality to be discussed below.

Figure 2:
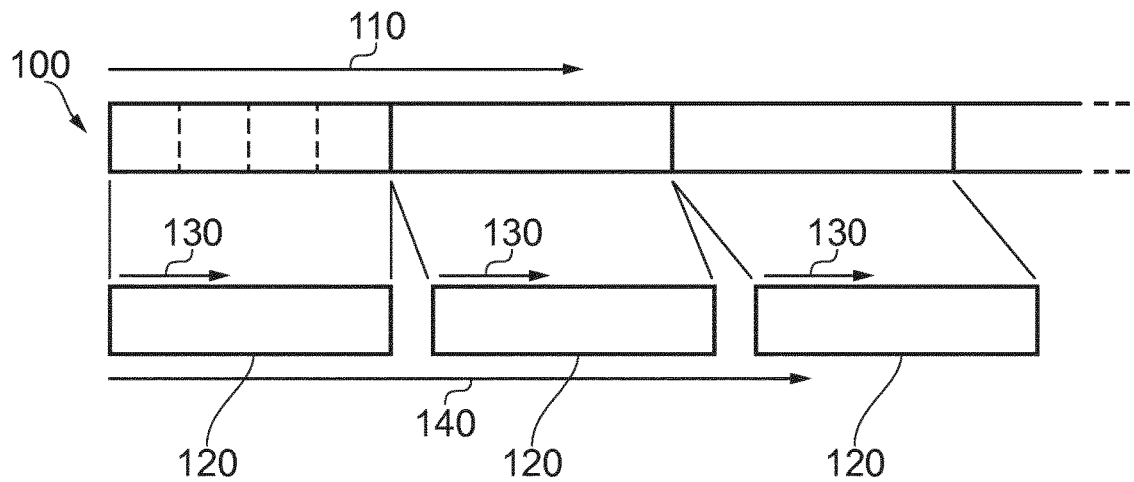
FIG. 2 schematically illustrates the handling of data as multiple data vectors.

FIG. 2 schematically illustrates the handling of data as multiple data vectors. In this arrangement, a set of data items 100 are intended to be processed in a processing order 110. The data items 100 are in fact handled as successive data vectors 120 so that in a vector processing operation, a single vector processing instruction is applied to all of the data items in the data vector (for example, 4 data items, 8 data items or whatever the vector length of the particular system is) simultaneously.

Having said this, each data vector 120 retains a data item processing order 130, and from vector to vector there is a vector processing order 140, so that if any reference is needed during processing to the original processing order 110, this can be achieved by considering the data vectors in the vector processing order 140 and considering data items within each data vector in the data item processing order 130. This consideration is relevant (at least) to the termination of loop processing, as discussed below.

Figure 3:
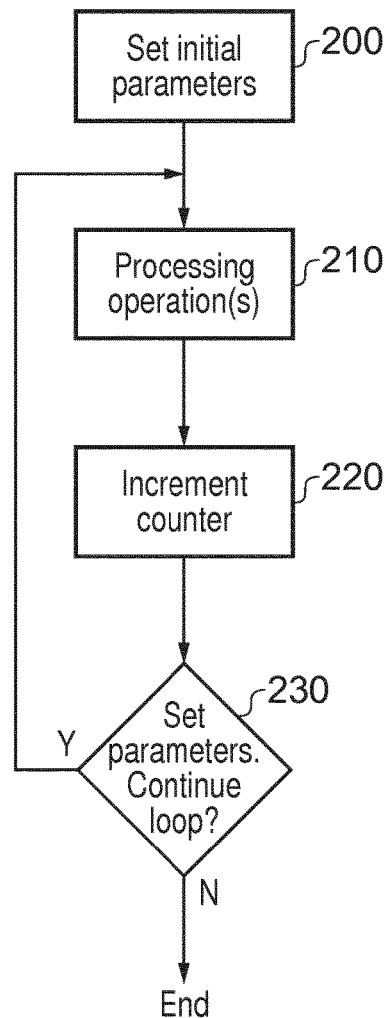
FIG. 3 is a schematic flowchart illustrating a looped operation.

FIG. 3 is a schematic flow chart illustrating a looped operation in a vector processing arrangement. At a step 200, initial parameters are established. A simple example here is that a loop control variable is set to an initial value such as 0, for example by an operation of the scalar processing circuitry 80.

At a step 210, one or more processing operations are carried out in respect of a current data vector. The current data vector may be, for example, defined with respect to a contiguous block of data 32 stored in the memory as follows:

$$\text{VectorA} = \text{Data}[SA+i \ldots SA+i+V_L-1]$$

where the variable i is the loop control variable, the variable SA is a starting address of the contiguous block of data and the variable $V_L$ is the vector length applicable to the particular processing system in use. In other words, in this example, a contiguous group of data items between the address (SA+i) and the address $(SA+i+V_L-1)$ inclusive form the $V_L$ data items of the vector VectorA.

This provides an example in which an example data vector VectorA is dependent at least in part on the loop control (or counter) variable, in that the loop control (or counter) variable defines a position of the data vector (such as a starting position) within a block or array of data or (as discussed below in a gathered arrangement) within a block or array of pointers.

In other examples, a so-called gathered data vector may be used, where a set of pointers to two or more non-contiguous locations in memory are provided in order to populate the data vector. Similarly, at the time of writing a data vector back to main memory, a so-called scatter process can be used so that data items are written back to non-contiguous memory locations. Such arrangements do not otherwise affect the way in which the processes described here operate, and so for the purposes of the present description a continuous data set (whether contiguously stored or not) will be assumed. It is noted however that the use of inactive predicate flags (discussed below) to avoid unnecessary gather or scatter operations from or to main memory can reduce the processing overhead of a vector processing operation.

Various different types of vector processing operation(s) can be carried out at the step 210. For example, a vector processing operation may be carried out with respect to data items of VectorA so as to generate results which are stored as data items of a second data vector, VectorB.

At a step 220, the counter or loop control variable is incremented so as to move the loop operation forward. Here, the term "increment" does not refer only to an increase by 1 but could refer to an increase by another value. Indeed, in the present example the loop control variable is incremented by the vector length $V_L$, as represented by the number of predicate flags, as determined by the processing circuitry for example.

At a step 230 the system detects whether to continue the loop operation, or in other words, whether the loop control variable has reached an ending point defined for that loop. If the loop operation should be continued then control returns to the step 210. Other parameters are also set at the step 220 and examples of this part of the process will be discussed below. Otherwise, the process ends.

A decision on whether to continue the loop operation can be taken in the form of a conditional jump, branch or other instruction which changes the program flow (for example, back to the step 210), where a condition can be indicated, for example, but one or more processor condition flags (for example, the N, Z, C and V flags) based on execution of an instruction such as a WHILE instruction to be discussed below. Accordingly, the WHILE instruction has the effect of setting one or more condition flags to control whether a separate (conditional branch or jump) instruction actually changes the program flow to continue the loop or not. (But in other examples, it is envisaged that the WHILE instruction could also perform the jump or branch as well).

In the case of program instructions intended for execution by different instances of vector processing circuitry (without a recompilation process) where those different instances may have different available vector lengths $V_L$, it can be useful to provide arrangements for controlling looped operations which operate according to whatever is the available length $V_L$ of the vector processing circuitry by which the instructions are being executed. (An alternative, which would be to fix a notional $V_L$ at the smallest level which may be encountered amongst the different instances of vector processing circuitries, could be inefficient by not making use of larger vector lengths available with some instances.) In example arrangements discussed here, rather than using scalar operations to control loop operation, predicate flags (discussed below) are used.

Figure 4:
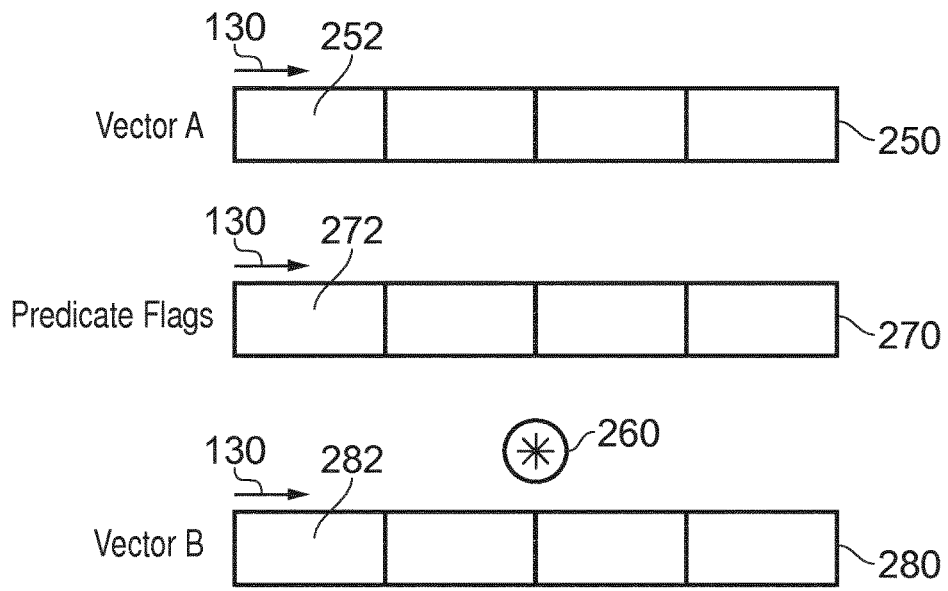
FIG. 4 schematically illustrates the use of predicate flags.

FIG. 4 schematically illustrates the use of predicate flags to control vector processing operations.

There can be instances where a single vector processing operation should be applied differently to different data items within a data vector. The vector processing circuitry 60 provides for this by the use of so-called predicate flags. Predicate flags comprise flag information provided for each data item position within a data vector to indicate whether a processing operation should be carried out in respect of that data item position. In examples, the vector processing circuitry 60 can access multiple sets of predicate flags, such that any particular vector processing operation can refer to one or more sets of predicate flags as parameters to that vector processing operation.

Referring to FIG. 4, an example arrangement uses data vectors comprising four data items ($V_L$=4) but it will be appreciated that these arrangements can apply to different vector lengths. An example input data vector 250 (VectorA) is to be the subject of a vector processing operation 260 such that, in the absence of any control by predicate flags, the vector processing operation 260 would be applied to each data item position. However, a set of predicate flags 270, one for each data item position or "lane", is also provided to control the vector processing operation.

The data items 252 of the input vector (vector A) are processed according to the vector processing operation 260 to generate data items 282 of an output data vector 280 (vector B). If the predicate flag 272 corresponding to a data item position in the output data vector 280 is set to "active" (for example, a value of 1). If the corresponding predicate flag for an output vector position is set to "inactive" (for example, a value of 0) then the vector processing operation 260 in respect of that output vector position is not carried out.

As discussed above, in the present examples the predicate flags control whether a vector processing operation for a particular output position or "lane" in relation to the output data vector 280 is carried out. However, in other examples, predicate flags could be used to control whether data item positions in the input vector (or one or more input vectors) 250 are used.

This therefore provides an example of the predicate flags having an active state indicating that the vector processing instruction should be applied to those positions of a data vector corresponding to predicate flags in the active state. An inactive state indicates that the vector processing operation should not be so applied.

If a vector processing operation is not carried out in respect of a particular output vector position 282, because of an inactive predicate flag, then in some examples a fixed value such as 0 can be inserted into that output position. In other examples the previous contents, whatever they are, of that output position can be left unchanged.

The use of predicate flags in this manner therefore provides an example of applying a vector processing instruction to one or more data items of a data vector comprising a plurality of data items at respective positions in the data vector, according to the state of respective predicate flags associated with the positions.

Figure 5:
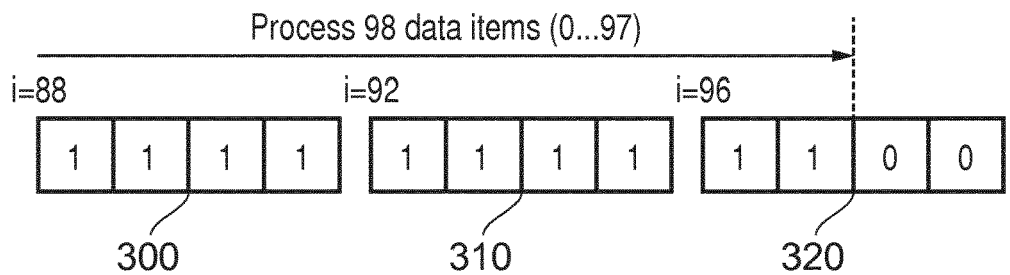
FIG. 5 schematically illustrates the control of predicate flags according to a counter variable.
Figure 6:
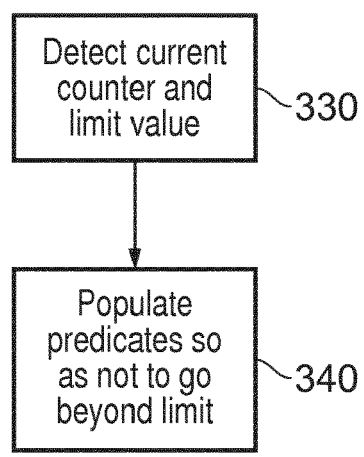
FIG. 6 is a schematic flowchart illustrating the setting of predicate flags by a WHILE instruction according to a counter variable.

The present examples allow for the use of predicate flags in the control of a looped operation such as that shown schematically in FIG. 3. FIGS. 5 and 6 will be used to explain aspects of this type of operation.

A feature of a looped operation is that a number of data items are handled in a data item processing order under the control of a loop control variable, until the loop control variable reaches a particular upper limit, at which point the loop terminates at the step 230 of FIG. 3. An example of a scalar processing loop is provided by the following schematic pseudo code:

For i=0 to 97
Process Data [i]
Next i

Here, the looped operation starts with the loop control variable i set to 0 and continues until the loop control variable i reaches the value of 97. In other words, in total, 98 data items are handled.

The loop operation can instead be performed using vector processing as discussed with reference to FIG. 3, so that the data items are handled one vector at a time. This can provide efficiencies by allowing groups of multiple data items to be handled by a single vector processing instruction.

For example, in the case of a system in which the vector length $V_L$ is 4, so each data vector contains four data items, the first 96 data items in the loop operation can be handled by just 24 (=96/4) vector processing operations. However, if a full $25^{th}$ vector of four data items were to be processed, this would take the number of process data items to 100, which is in excess of the required loop operation.

Instead, the final vector processing operation should operate only with respect to the $97^{th}$ and $98^{th}$ data items (in the processing order 110) and not in respect of the $99^{th}$ and $100^{th}$ data items in the processing order 110.

Example embodiments provide a WHILE instruction to control the vector processing circuitry 60 to apply a vector processing instruction to one or more data items of a data vector defined at least in part by a control variable such as a loop control variable, for example in a looped operation. The WHILE instruction is responsive to the control variable so as to select one or more of the predicate flags for setting to the active state so that the number of data items processed does not exceed the upper loop limit.

An example of the use of this arrangement is shown FIG. 5 which schematically illustrates the last three data vectors to be handled in the example loop operation discussed above, where (purely for the purposes of this example) 98 data items are to be processed, and $V_L$=4.

As discussed above, in the example loop of 98 data items, the data items are handled a data vector at a time, and given that the data vector length $V_L$ in this example is 4 data items, the loop counter will start from 0 and advance in units of $V_L$ (0, 4, 8, 12 . . . ). The situation in respect of the last three instances of the loop counter advancing in this way is shown schematically in FIG. 5, namely those at which the loop counter is set to 88, 92 and then 96. The predicate flags 300, 310, 320 applicable to each of these situations are illustrated where a logical value of 1 indicates "active" and logical value of 0 indicates "inactive".

The predicate flags are set by the WHILE instruction according to a predetermined ordering of the predicate flags, which corresponds to the data item processing order 130 of each data vector.

When i=88, the WHILE instruction detects that all four predicate flags can be set to 1 (active) and the total number of data items processed as a result of setting those predicate flags to 1 will still be less than the upper loop limit of 97. Similarly, when i is advanced to 92, the WHILE instruction detects that all four predicate flags 310 can be set to 1 and still, at the end of processing that data vector, the number (96) of data items processed will still be less than the total required number of 98.

At the third instance shown in FIG. 5, the loop control variable i is set to 96. The WHILE instruction detects that in order to comply with the upper loop limit of 97, there are only two data items to be processed in this, final, vector processing operation of the loop. The WHILE instruction therefore sets the first two predicate flags (in the processing order 130) to 1 and the other two predicate flags (in the order 130) to 0, so that the processing operations at the step 210 can be carried out according to those predicate flags and still not exceed the total number of operations defined by the upper limit of the loop control variable i.

As part of its operation, the WHILE instruction also provides at least part of the functionality of the step 230 and sets one or more condition flags to control the passing of control back to the step 210 of FIG. 3 as long as there are still processing operations to be carried out, which is to say that the value of i passed to the WHILE instruction at the step 220 is less than the upper loop control variable limit (97 in this example).

This therefore provides an example of the WHILE instruction, when executed, selects one or more of the predicate flags for setting to the active state so that a value of the control variable, taking into account the number of predicate flags selected for setting to the active state, does not breach the arithmetic condition. Here, "taking into account" could mean, in the case of an incrementing counter, adding to the current counter value, and in the case of a decrementing counter, subtracting from the current counter value. The one or more of the predicate flags for setting to the active state can be selected according to a predetermined ordering of the predicate flags, for example the order 130.

FIG. 6 is a schematic flow chart representing the setting of predicate flags by a WHILE instruction according to a counter variable.

In FIG. 6, at a step 330 the WHILE instruction detects the current counter (loop control variable) value and the limit value (i and 97 respectively in the present examples). At a step 340, the WHILE instruction populates the predicate flags so that a value of the loop control variable, plus (in this example) the number of predicate flags selected for setting to the active state, does not breach the upper limit of the loop control variable.

Of course, it will be appreciated that in other examples a loop control variable could count down instead of up, in which case the limit value would be a lower limit value rather than an upper limit value. Similarly, the arithmetic test applied at the step 340 by the WHILE instruction would be a test as to whether the control variable was greater than the lower limit value. It will also be appreciated that a "less than or equal to" or a "greater than or equal to" test can be applied, for example so that the looped operation terminates one instance short of the limit value. In general, the arithmetic condition applied by the WHILE instruction can be a condition selected from the list consisting of:

the control variable being less than an upper limit value;
the control variable being greater than a lower limit value;
the control variable being less than or equal to an upper limit value; and
the control variable being greater than or equal to an lower limit value.

Figure 7:
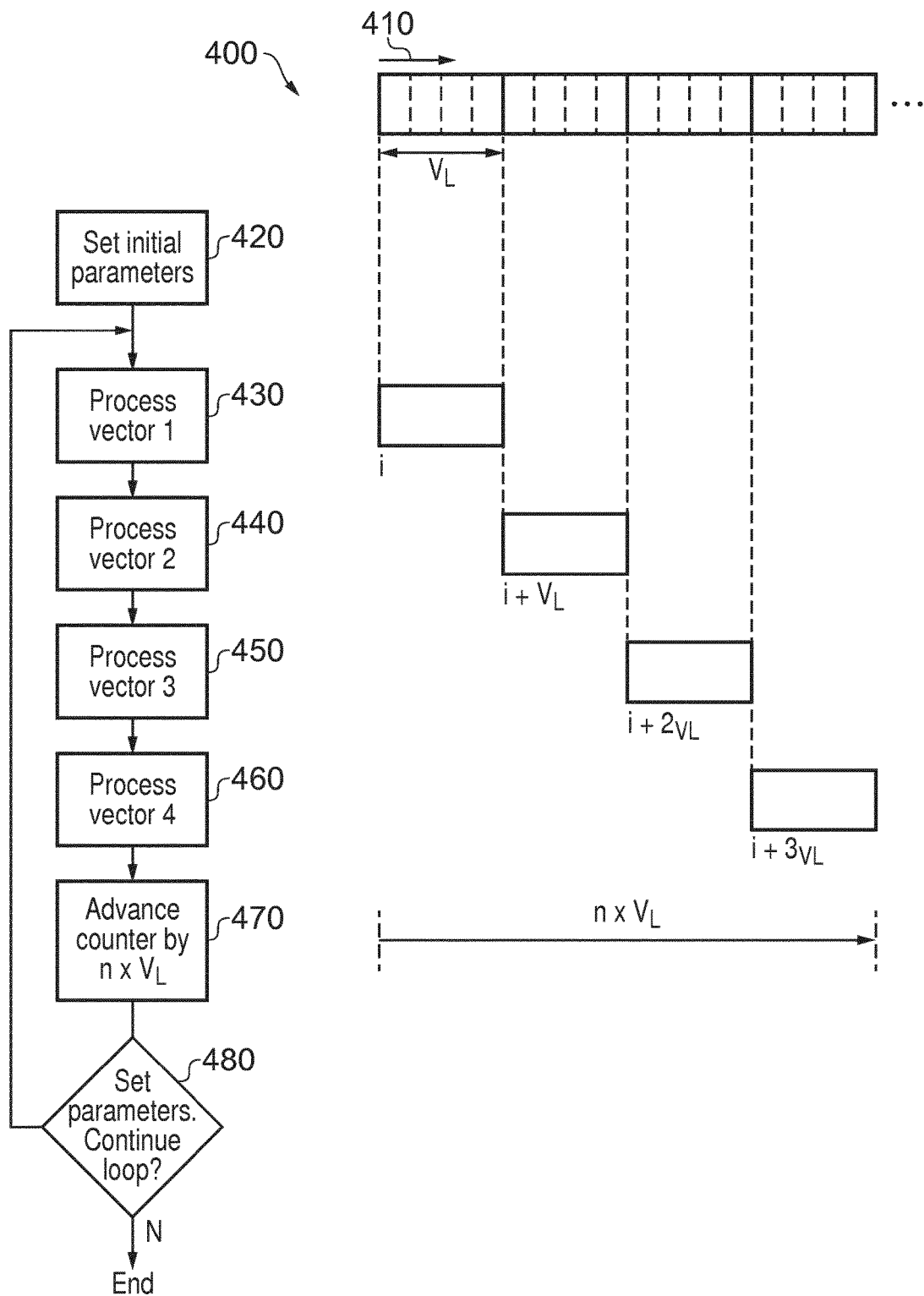
FIG. 7 schematically illustrates a so-called unrolled loop.

FIG. 7 schematically illustrates a so-called "unrolled" loop.

In the absence of unrolling, each iteration of a looped operation carries out a single data vector's worth of processing. The loop then advances to a next loop position and a next data vector's worth of processing is carried out, and so on.

"Unrolling" a loop involves processing multiple successive data vectors within a single loop iteration. Loop unrolling is carried out, for example, in order to improve efficiency, in that the processing overheads involved in initiating and terminating each iteration of the loop are then shared between the processing of multiple data vectors.

In FIG. 7, data 400 to be processed, having a data processing order 410, is arranged for the purposes of the loop processing into multiple data vectors each having a vector length $V_L$. In the example shown, $V_L$ is equal to 4 but of course different values could be used according to the parameters of the vector processing circuitry 60 in use.

The operations are similar to those described with reference to FIG. 3, except that multiple data vectors are processed at each loop iteration. Accordingly, at a step 420, initial parameters are set in a similar manner to the step 200 of FIG. 3. For example, a loop control variable or counter is initialised to 0. Then, at step 430, 440, 450 and 460, multiple successive data vectors are subjected to the same processing. The step 430 involves processing a data vector having a starting position within the data 400 defined by the loop control variable i. The step 440 applies the same processing, but to a data vector having a starting position in the data 400 defined by i+$V_L$, and so on. It will be appreciated that the number of data vectors processed in each iteration of the loop can be any number greater than or equal to 2, and the use of 4 data vectors in this example is merely for the purposes of this explanation. At a step 470, the loop control variable i is advanced by n×$V_L$, where n is the number of data vectors processed at each iteration of the unrolled loop. At a step 480, the WHILE instruction sets parameters (the predicate flags as discussed in connection with FIGS. 5 and 6) and detects whether to set one or more condition flags so as to continue the loop or not continue the loop. If the loop is continued, control passes to the step 430 again (for example, by the WHILE instruction setting a flag such as a condition flag, and a conditional jump or branch instruction responding to that condition), and if not the process follows an end procedure.

The flowcharts of FIGS. 3 and 7, read in conjunction with the description of FIGS. 5 and 6, provides an example of decoding (for example, by the decoder circuitry 50): a WHILE instruction (as discussed, at the steps 230, 480) to control a vector processor to apply a vector processing instruction to one or more data items of a data vector defined at least in part by a control variable, the data vector comprising a plurality of data items at respective positions in the data vector, according to the state of respective predicate flags associated with the positions, while an arithmetic condition applies to the control variable; and a CHANGE instruction to change (for example, at the step 220 or the step 470) the value of the control variable by an amount dependent upon a number of the predicate flags, the CHANGE instruction having an associated saturation value, so that execution of the CHANGE instruction changing the value of the control variable no further than the saturation value; and executing (for example, by the vector processing circuitry 60 and/or the scalar processing circuitry 80) instructions decoded by the instruction decoder.

The steps 230, 480 provide an example of the WHILE instruction, when executed, causes the processor to continue iteratively executing a processing loop while an arithmetic condition applies to the control variable, for example by setting one or more condition flags as discussed above.

Figure 8:
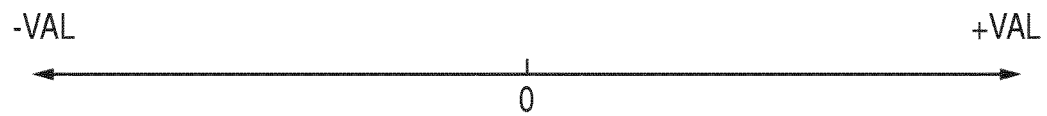
FIGS. 8 and 9 schematically illustrate values representable by a counter variable.
Figure 9:

FIGS. 8 and 9 schematically illustrate values representable by a counter variable. In the case of FIG. 8, the counter variable is a signed variable so that values between a lower limit of −VAL and an upper limit of +VAL are representable. In the case of FIG. 9, the counter variable is unsigned so that values between 0 and an upper limit of +VAL are representable. Note that in the case of FIG. 8, the upper and lower limits could have different magnitudes so that a lower limit is $-VAL_1$ and an upper limit is $+VAL_2$, where $|VAL_1|$ and $|VAL_2|$ are different (where $|x|$ represents the modulus or magnitude of x). For example, in an 8-bit signed two's complement representation, $-VAL_1$ might be −127 and $+VAL_2$ might be +128. Similarly, the upper limit of +VAL in FIG. 9 is not necessarily the same as the upper limit of +VAL in FIG. 8. But in either instance, the principle being illustrated is that a property of the counter variable can be indicated by the lower and upper limits of the values it can represent.

Figures 10, 11:
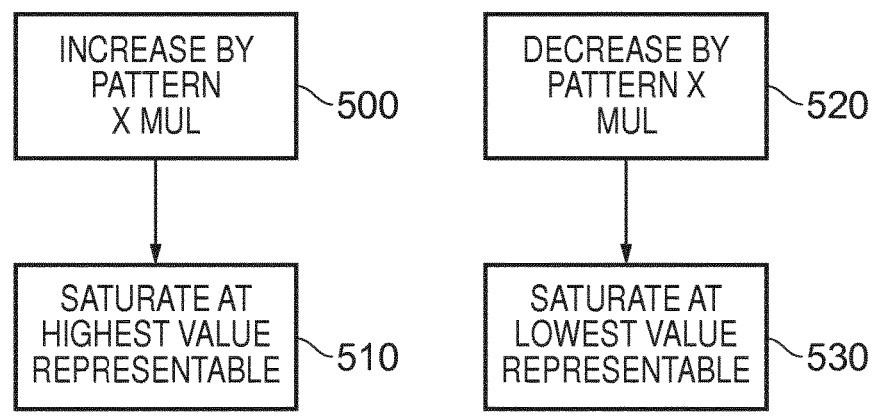
FIGS. 10 and 11 are schematic flowcharts illustrating the operation of increment and decrement instructions, respectively.

FIGS. 10 and 11 are schematic flow charts illustrating the operation of increment and decrement instructions, respectively.

Referring to FIG. 10, at a step 500 the increment instruction increases a variable such as a loop control variable by an amount dependent upon a pattern (to be described further below) multiplied by a factor MUL, where in examples of the use of such an instruction in a step such as the step 470 of an unrolled loop, the value MUL can be set to the number of successive data vectors processed in one iteration of the loop.

At a step 510, the increment instruction saturates at the highest value representable by the variable. The saturation step relates to the following. If the result of the step 500 is still less than the highest value (such as +VAL) representable by that variable, then the output of the step 500 is returned as the result of the increment instruction. If, on the other hand, the output of the step 500 would be in excess of the highest value representable by that variable, such that (for example) the variable would wrap round (exceed the number of bits available for that variable) or restart from the other extreme representable value, then the step 510 saturates or caps the increase so as not to reach but not to exceed the highest representable value (such as +VAL) as the output returned by the execution of the instruction.

The saturation (whether with the use of the MUL factor, as in the step 470, or without, as in the step 220) can be relevant in situations where a WHILE or similar operation or instruction is used at the step 230 or 480, causes the continued execution of the loop if the loop control variable or counter complies with an arithmetic condition. In an example of an upward-counting counter having an upper limit, the arithmetic condition could be, for example, whether the counter value is less than (or less than or equal to) a particular limit value. If however the saturation feature were not used, a potential risk is that the counter would go beyond the maximum value representable by the counter variable and "wrap round" or restart at the lowest (or another) value representable by the counter variable.

Because the counter advances in units of $V_L$, the WHILE arithmetic test could be (correctly) passed at one loop iteration and then, for the next such test, the counter could have wrapped round so the test would be (incorrectly) passed at a next iteration.

As a worked example, if the counter variable were maintained as a simple 8 bit unsigned value, then without the saturation feature the counter could reach a maximum count of 255 before continuing to count up from 0. Assume that $MUL \times V_L$ is 8, so the counter advances in units of 8, and that the end of the loop is defined by i=253. Using a "less than" test at the step 230 or 480 would then not work, because a value of (say) the wrapped-round value (0 or close to 0) would pass the test, whereas the test ought to have been failed because the counter would pass the test at i=248, but at the next iteration i would wrap back round to 0 and so (incorrectly) pass the "less than" test again. The saturation feature would cause the counter to saturate at 255 in its final iteration, and so the counter i would (correctly) fail the "less than 253" test.

Note that the saturation value is a property of the way in which the counter variable is stored or maintained. It is not the same as the particular limit imposed on the counter variable by an instance of looped operation.

The "pattern" parameter will now be discussed. This provides a change amount dependent upon the number of available predicate flags, which in turn provides an arrangement which automatically scales according to vector length, thereby contributing to allowing the same program instructions to be executed, without necessarily requiring an intervening recompilation, by instances of vector processing circuitries having different available vector lengths.

The "change" instruction, when used in a situation such as the step 220 or 470, changes (increments or decrements) a variable by an amount dependent upon at least a multiplication factor MUL (which could be 1 or could be greater than 1, for example a value representable by a 3-bit parameter, for example 1 . . . 8). The amount of the change (increment or decrement) is also dependent upon the number of predicate flags as a representation of $V_L$ (as detected by the vector processing circuitry for example). For example, the appropriate change might be by $MUL \times V_L$ if each predicate flag corresponds to a data item. But in other examples, the individual data items might be twice as large as in the first example (for example, half-words instead of bytes) so it might be that only every alternate predicate flag is being validly used. In such an instance the effective value of $V_L$ might be half as large as the number of predicate flags, in which case the change amount should be (MUL×number_of_predicate_flags/2).

The CHANGE instruction detects the number of predicate flags according to a pattern, and (after multiplying by MUL) increments or decrements the variable by that number. The pattern could be for example, a pattern of alternate predicate flags, or every fourth predicate flag, or various other patterns with a default of "all predicate flags". This arrangement provides a self-adjusting increment or decrement instruction so that the change amount depends upon the number of predicate flags available to the system on which the instruction is running. In turn, this means that the same instructions can be used on different systems with different available vector lengths, as the increment or decrement instruction will adjust to the currently available vector length.

Accordingly, this provides an example of the CHANGE instruction, when executed, changing the value of the variable by an amount dependent upon a selected subset of the number of the predicate flags, and the modifying value. Note that as mentioned, the subset could in fact be "all". The selected subset is dependent upon a parameter of the instruction, and the detection of the subset to use is part of the execution of the instruction by the same processing circuitry, arrangements or resources which execute other aspects of the instruction.

FIG. 11 is a schematic flow chart illustrating a similar operation of a decrement instruction such that at a step 520 a variable such as a loop control variable is decreased by the product (or other combination) of a pattern amount and a factor MUL, and at a step 530 the result is saturated at the lowest value representable by that variable, or in other words reaches, but is constrained from going any lower than, the lowest amount representable by that variable.

Note that the counter I can be a scalar variable and so could be handled (updated and tested) by the scalar processing circuitry 80, or could be handled as a data vector or part of a data vector, and so could be handled by the vector processing circuitry 60.

FIGS. 10 and 11 therefore provide examples of executing a "change" instruction having a modifying value (such as MUL) as an instruction parameter, the CHANGE instruction changing the value of a variable by an amount dependent upon a number of the predicate flags and dependent upon the modifying value. For example, successive changes or the step size could be proportional to the modifying value.

The apparatus of FIG. 1, when executing operations corresponding to those shown in the flowcharts of FIG. 10 or 11, provides an example of data processing apparatus (such as the apparatus 10) comprising: vector processing circuitry (such as the circuitry 60 operating in cooperation with the registers 70) to apply a vector processing instruction to one or more data items of a data vector comprising a plurality of data items at respective positions in the data vector, according to the state of respective predicate flags associated with the positions; an instruction decoder (such as the decoder circuitry 50) to decode a CHANGE instruction (for example, represented by the flowcharts of FIG. 10 or 11) having a modifying value (such as MUL) as an instruction parameter, the CHANGE instruction, when executed, changing the value of a variable (such as a loop control variable) by an amount dependent upon a number of the predicate flags and dependent upon the modifying value; and an instruction processor (such as the scalar processing circuitry 80 or the vector processing circuitry 60) to execute instructions decoded by the instruction decoder. For example, the CHANGE instruction, when executed, can change the value of a variable by an amount dependent upon a product of a value dependent upon the number of the predicate flags and the modifying value.

As discussed with reference to the steps 510, 530, the CHANGE instruction may have an associated saturation value, so that the CHANGE instruction, when executed, changes the value of the variable no further than the saturation value. As discussed with reference to FIGS. 8 and 9, in the case of a decrementing instruction to reduce the value of the variable, the saturation value may be a minimum value which can be represented by the variable. In the case of an incrementing instruction to increase the value of the variable, the saturation value may be a maximum value which can be represented by the variable.

When such an instruction is used in the context of, for example, the step 470 of the looped operation of FIG. 7, in which the variable is a counter variable, the vector processing circuitry applying the vector processing instruction to a data vector defined at least in part by the counter variable during one or more iterations of a processing loop, the instruction decoder can be configured to decode an instruction (for example, corresponding to the step 480) to detect whether to continue iteratively executing the processing loop in dependence upon the counter variable. Such an instruction may be, for example, a WHILE instruction to set condition flags so as to control the processing circuitry to continue iteratively executing the processing loop while an arithmetic condition applies to the counter variable. Examples of the arithmetic condition include: the counter variable being less than an upper limit value; the counter variable being greater than a lower limit value; the counter variable being less than or equal to an upper limit value; and the counter variable being greater than or equal to a lower limit value.

Figure 12:
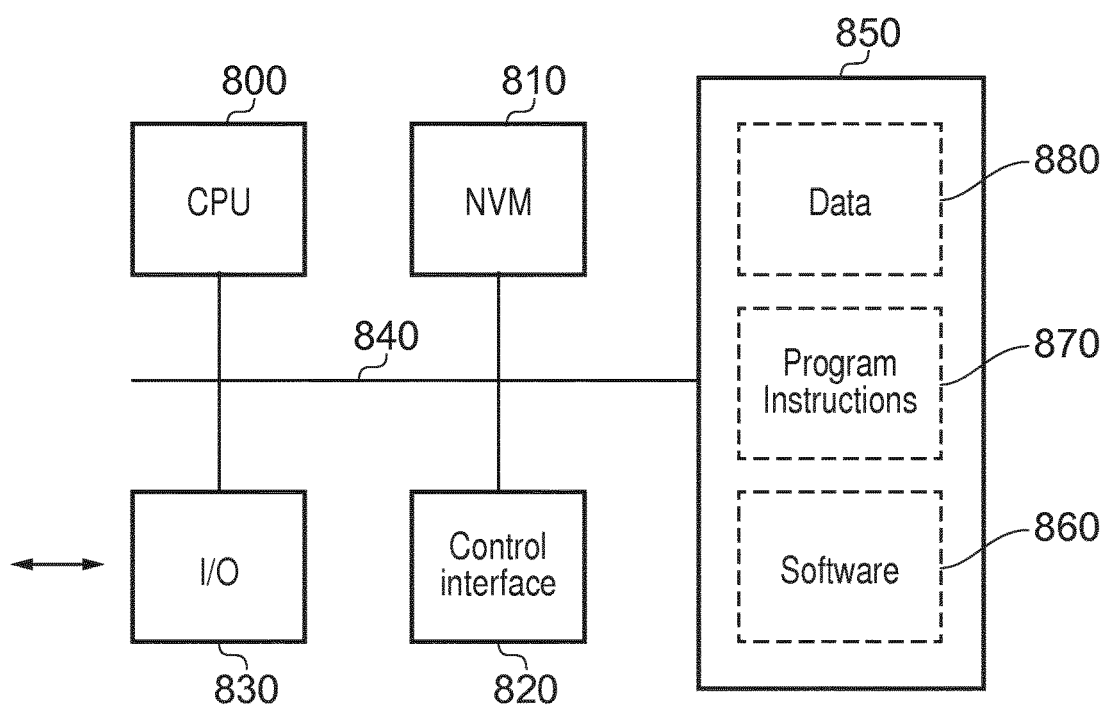
FIG. 12 schematically illustrates a virtual machine.

FIG. 12 schematically illustrates a virtual machine by which some or all of the functionality discussed above is provided. The virtual machine comprises a central processing unit (CPU) as an example of data processing circuitry 800, a non-volatile memory 810, a control interface 820 and an input/output (IO) interface 830, all interconnected by a bus arrangement 840. A random access memory (RAM) 850 stores program instructions providing software 860 to control operations of the CPU 800. Under the control of the software 860, the CPU 800 provides or emulates the functionality of one or more of the processing instructions discussed above. The RAM 850 also stores program instructions 870 and data 880, where the program instructions 870 are instructions applicable to the processor 20 of FIG. 1 and which are interpreted, emulated or otherwise executed by the CPU 800 acting as a virtual machine. The data 880 is data corresponding to the data 32 of FIG. 1 to be acted upon by (virtual) execution of the program instructions 870. The arrangement of FIG. 19 therefore provides an example of a virtual machine comprising a data processor (such as the CPU 800) to execute a computer program comprising machine readable instructions (for example the software 860), in which execution of the computer program causes the data processor to operate as a data processing apparatus of the type described above. Example embodiments are also represented by computer software which, when executed by a computer, causes the computer to carry out one or more of the techniques described above, and by a non-transitory machine readable storage medium which stores such computer software.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

1. Data processing apparatus comprising:
    processing circuitry to selectively apply vector processing operations to one or more data items of a data vector comprising a plurality of data items at respective positions in the data vector, according to the state of respective predicate flags associated with the positions; the processing circuitry comprising:
    instruction decoder circuitry to decode program instructions; and
    instruction processing circuitry to execute instructions decoded by the instruction decoder circuitry;
    wherein the instruction decoder circuitry is responsive to a CHANGE instruction having a modifying value as an instruction parameter, to control the instruction processing circuitry to change the value of a variable by an amount dependent upon a number of the predicate flags and the modifying value.

2. Apparatus according to clause 1, in which the instruction decoder circuitry is responsive to the CHANGE instruction to control the instruction processing circuitry to change the value of the variable by an amount dependent upon a product of a value dependent upon the number of the predicate flags and the modifying value.

3. Apparatus according to clause 1, in which the CHANGE instruction has an associated saturation value, so that the instruction decoder circuitry is responsive to the CHANGE instruction to control the instruction processing circuitry to change the value of the variable no further than the saturation value.

4. Apparatus according to clause 3, in which:
    the CHANGE instruction is a decrementing instruction to reduce the value of the variable; and
    the saturation value is a minimum value which can be represented by the variable.

5. Apparatus according to clause 3, in which:
    the CHANGE instruction is an incrementing instruction to increase the value of the variable; and
    the saturation value is a maximum value which can be represented by the variable.

6. Apparatus according to clause 1, in which the variable is a counter variable, the processing circuitry applying the vector processing instruction to a data vector defined at least in part by the counter variable during one or more iterations of a processing loop;
    the instruction decoder circuitry is responsive to a further instruction to control the instruction processing circuitry to detect whether to continue iteratively executing the processing loop in dependence upon the counter variable.

7. Apparatus according to clause 6, in which the further instruction to detect whether to continue executing the processing loop comprises a WHILE instruction, the instruction decoder circuitry being responsive to the WHILE instruction to control the instruction processing circuitry to continue iteratively executing the processing loop while an arithmetic condition applies to the counter variable.

8. Apparatus according to clause 7, in which the arithmetic condition is a condition selected from the list consisting of:
    i. the counter variable being less than an upper limit value;
    ii. the counter variable being greater than a lower limit value;
    iii. the counter variable being less than or equal to an upper limit value; and
    iv. the counter variable being greater than or equal to a lower limit value.

9. Apparatus according to clause 7, in which the instruction decoder circuitry is responsive to the CHANGE instruction to control the instruction processing circuitry to change the value of the variable by an amount dependent upon a selected subset of the number of the predicate flags, and the modifying value.

10. Apparatus according to clause 9, in which the instruction decoder circuitry is responsive to the WHILE instruction to control the instruction processing circuitry to select one or more of the predicate flags for setting to the active state so that a value of the loop variable, taking into account the number of predicate flags selected for setting to the active state, does not breach the arithmetic condition.

11. Apparatus according to clause 10, in which the instruction decoder circuitry is responsive to the WHILE instruction to control the instruction processing circuitry to select one or more of the predicate flags for setting to the active state according to a predetermined ordering of the predicate flags, so that a value of the loop variable, taking into account the number of predicate flags selected for setting to the active state, does not breach the arithmetic condition.

12. Data processing apparatus comprising:
    means for selectively applying vector processing operations to one or more data items of a data vector comprising a plurality of data items at respective positions in the data vector, according to the state of respective predicate flags associated with the positions; the applying means comprising:
    means for decoding instructions; and
    means for executing instructions decoded by the means for decoding;
    wherein the means for decoding instructions is responsive to a CHANGE instruction having a modifying value as an instruction parameter to control the means for executing instructions to change the value of a variable by an amount dependent upon a number of the predicate flags and dependent upon the modifying value.

13. A data processing method comprising:
    selectively applying vector processing operations to one or more data items of a data vector comprising a plurality of data items at respective positions in the data vector, according to the state of respective predicate flags associated with the positions;
    decoding instructions; and
    executing instructions;
    in which the decoding step is responsive to a CHANGE instruction having a modifying value as an instruction parameter to control the executing step to change the value of a variable by an amount dependent upon a number of the predicate flags and dependent upon the modifying value.

14. Computer software which, when executed by a computer, causes the computer to carry out the method of clause 13.

15. A non-transitory machine readable storage medium which stores computer software according to clause 14.

16. A virtual machine comprising a data processor to execute a computer program comprising machine readable instructions, in which execution of the computer program causes the data processor to operate as a data processing apparatus comprising:
    a processor to selectively apply vector processing operations to one or more data items of a data vector comprising a plurality of data items at respective positions in the data vector, according to the state of respective predicate flags associated with the positions; the processor comprising:
    an instruction decoder to decode instructions; and
    an instruction processor to execute instructions decoded by the instruction decoder.

in which the instruction decoder is responsive to a CHANGE instruction having a modifying value as an instruction parameter to control the instruction processor to change the value of a variable by an amount dependent upon a number of the predicate flags and dependent upon the modifying value.

The invention claimed is:

1. Data processing apparatus comprising:
  instruction decoder circuitry to decode instructions; and
  instruction processing circuitry to execute instructions decoded by the instruction decoder circuitry during one or more iterations of a processing loop defined by a counter variable, the processing icon being iteratively executed while an arithmetic condition defining a total required number of data items to be handled by the processing loop applies to the counter variable;
  the instruction decoder circuitry being responsive to a WHILE instruction to control the instruction processing circuitry to apply a vector processing instruction to one or more data items of a data vector defined at least in part by the counter variable so that the counter variable defines a position of the data vector within a block or array of data or within a block or array of pointers, the data vector comprising a plurality of data items at respective positions in the data vector, according to the state of respective predicate flags associated with the positions, in which the predicate flags have an active state indicating that the vector processing instruction should be applied to those positions of a data vector corresponding to predicate flags in the active state; and
  the instruction decoder circuitry being responsive to a CHANGE instruction to control the instruction processing circuitry to change the value of the counter variable by an amount dependent upon the total number of predicate flags available according to an associated saturation value so as to change the value of the counter variable no further than the saturation value; and
  in which the instruction decoder circuitry is responsive to the WHILE instruction to control the instruction processing circuitry to select one or more of the predicate flags for setting to the active state so that the number of data items processed in a final vector processing operation of the processing loop does not exceed the total required number for the processing loop.

2. Apparatus according to claim 1, in which the arithmetic condition is a condition selected from the list consisting of:
  i. the counter variable being less than an upper limit value;
  ii. the counter variable being greater than a lower limit value;
  iii. the counter variable being less than or equal to an upper limit value; and
  iv. the counter variable being greater than or equal to a lower limit value.

3. Apparatus according to claim 1, in which the instruction decoder circuitry is responsive to the WHILE instruction to control the instruction processing circuitry to select one or more of the predicate flags for setting to the active state so that a value of the counter variable, taking into account the number of predicate flags selected for setting to the active state, does not breach the arithmetic condition.

4. Apparatus according to claim 3, in which the instruction decoder circuitry is responsive to the WHILE instruction to control the instruction processing circuitry to select one or more of the predicate flags for setting to the active state according to a predetermined ordering of the predicate flags.

5. Apparatus according to claim 1, in which the instruction decoder circuitry is responsive to the WHILE instruction to control the instruction processing circuitry to continue iteratively executing a processing loop while an arithmetic condition applies to the counter variable.

6. Apparatus according to claim 1, in which the instruction decoder circuitry is responsive to the CHANGE instruction to control the instruction processing circuitry to change the value of the counter variable by an amount dependent upon the total number of predicate flags available and dependent upon a modifying value forming a parameter of the CHANGE instruction.

7. Apparatus according to claim 1, in which:
  the CHANGE instruction is a decrementing instruction to reduce the value of the counter variable; and
  the saturation value is a minimum value which can be represented by the counter variable.

8. Apparatus according to claim 1, in which:
  the CHANGE instruction is an incrementing instruction to increase the value of the counter variable; and
  the saturation value is a maximum value which can be represented by the counter variable.

9. Data processing apparatus comprising:
  means for decoding instructions; and
  means for executing instructions decoded by the means for decoding during one or more iterations of a processing loop defined by a counter variable, the processing loop being iteratively executed white an arithmetic condition defining a total required number of data items to be handled by the processing loco applies to the counter variable;
  the means for decoding being responsive to a WHILE instruction to control the means for executing to apply a vector processing instruction to one or more data items of a data vector defined at least in part by the counter variable so that the counter variable defines a position of the data vector within a block or array of data or within a block or array of pointers, the data vector comprising a plurality of data items at respective positions in the data vector, according to the state of respective predicate flags associated with the positions, in which the predicate flaps have an active state indicating that the vector processing instruction should be applied to those positions of a data vector corresponding to predicate flags in the active state; and
  the means for decoding being responsive to a CHANGE instruction to control the means for executing to change the value of the counter variable by an amount dependent upon the total number of predicate flags available which are currently set to a particular state, the CHANGE instruction having an associated saturation value, so that execution of the CHANGE instruction being operable to change the value of the counter variable no further than the saturation value, and
  in which the means for decoding instructions is responsive to the WHILE instruction to control the means for executing to select one or more of the predicate flags for setting to the active state so that the number of data items processed in a final vector processing operation of the processing loop does not exceed the total required number for the processing loop.

10. A data processing method comprising:
  decoding instructions; and
  executing instructions decoded by the decoding step during one or more iterations of a processing loop defined by a counter variable, the processing loop being iteratively executed while an arithmetic condition defining a total required number of data items to be handled by the processing loop applies to the counter variable;
    the decoding step being responsive to a WHILE instruction to control the executing step to apply a vector processing instruction to one or more data items of a data vector defined at least in part by the counter variable so that the counter variable defines a position of the date vector within a block or array of data or within a block or array of pointers, the data vector comprising a plurality of data items at respective positions in the data vector, according to the state of respective predicate flags associated with the positions in which the predicate flaps have an active state indicating that the vector processing instruction should be applied to those positions of a data vector corresponding to predicate flags in the active state; and
    the decoding step being responsive to a CHANGE instruction to control the executing step to change the value of the counter variable by an amount dependent upon the total number of predicate flags available which are currently set to a particular state, the CHANGE instruction having an associated saturation value, so that execution of the CHANGE instruction changing the value of the counter variable no further than the saturation value;
    and in which the decodine step is responsive to the WHILE instruction to control the executing step to select one or more of the predicate flags for setting to the active state so that the number of data items processed in a final vector processing operation of the processing loon does not exceed the total required number for the processing loop.

11. A non-transitory machine readable storage medium which stores computer software which, when executed by a computer, causes the computer to carry out a method comprising,
  decoding instructions; and
  executing instructions decoded by the decoding step during one or more iterations of a processing loop defined by a counter variable, the processing loop being iteratively executed while an arithmetic condition defining a total required number of date items to be handled by the processing loop applies to the counter variable,
    the decoding step being responsive to a WHILE instruction to control the executing step to apply a vector processing instruction to one or more data items of a data vector defined at least in part by the counter variables so that the counter variable defines a position of the data vector within a block or array of date or within a block or array of pointers, the data vector composing a plurality of data items at respective positions in the data vector, according to the state of respective predicate flags associated with the positions in which the predicate flags have an active state indicating that the vector processing instruction should be applied to those positions of e data vector corresponding to predicate flags in the active state; and
    the decoding step being responsive to a CHANGE instruction to control the executing step to change the value of the counter variable by an amount dependent upon the total number of predicate flags available which are currently set to a particular state, the CHANGE instruction having an associated saturation value, so that execution of the CHANGE instruction changing the value of the counter variable no further than the saturation value;
    and in which the decoding step is responsive to the WHILE instruction to control the executing step to select one or more of the predicate flags for setting to the active state so that the number of data items processed in a final vector processing operation of the processing loop does not exceed the total required number for the processing loop.

12. A virtual machine comprising a data processor to execute a computer program comprising machine readable instructions, in which execution of the computer program causes the data processor to operate as a data processing apparatus comprising:
  an instruction decoder to decode instructions; and
  an instruction processor to execute instructions decoded by the instruction decoder during one or more iterations of a processing loop defined by a counter variable, the processing loop being iteratively executed while an arithmetic condition defining a total required number of data items to be handled by the processing loop applies to the counter variable;
    the instruction decoder being responsive to a WHILE instruction to control the instruction processor to apply a vector processing operation to one or more data items of a data vector defined at least in part by the counter variable so that the counter variable defines a position of the data vector within a block or array of data or within a block or array of pointers, the data vector comprising a plurality of data items, according to the state of respective predicate flags associated with the plurality of data items in which the predicate flags have an active state indicating that the vector processing instruction should be applied to those positions of a data vector corresponding to predicate flags in the active state; and
    the instruction decoder being responsive to a CHANGE instruction to control the instruction processor to change the value of the counter variable by an amount dependent upon the total number of predicate flags available which are currently set to a particular state, the CHANGE instruction having an associated saturation value, so that execution of the CHANGE instruction, when executed, changing the value of the counter variable no further than the saturation value;
  end in which the instruction decoder circuitry is responsive to the WHILE instruction to control the instruction processing circuitry to select one or more of the predicate flags for setting to the active state so that the number of data items processed in a float vector processing operation of the processing loop does not exceed the total required number for the processing loop.

* * * * *